US012338000B2

(12) United States Patent
Deltour et al.

(10) Patent No.: US 12,338,000 B2
(45) Date of Patent: Jun. 24, 2025

(54) SPACECRAFT COMPRISING AN ELECTRICAL DEVICE AND AN ORIENTATION SYSTEM FOR SAID ELECTRICAL DEVICE

(71) Applicant: AIRBUS DEFENCE AND SPACE SAS, Toulouse (FR)

(72) Inventors: Bernard Deltour, Toulouse (FR); Gilles Pupille, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/686,357

(22) PCT Filed: Aug. 23, 2022

(86) PCT No.: PCT/FR2022/051602
§ 371 (c)(1),
(2) Date: Feb. 23, 2024

(87) PCT Pub. No.: WO2023/026011
PCT Pub. Date: Mar. 2, 2023

(65) Prior Publication Data
US 2024/0359830 A1     Oct. 31, 2024

(30) Foreign Application Priority Data
Aug. 26, 2021    (FR) .................................... 2108922

(51) Int. Cl.
*B64G 1/40*      (2006.01)
*B64G 1/42*      (2006.01)
*F03H 1/00*      (2006.01)
(52) U.S. Cl.
CPC ............. *B64G 1/413* (2023.08); *B64G 1/428* (2013.01); *F03H 1/0037* (2013.01)

(58) Field of Classification Search
CPC . B64G 1/26; B64G 1/40; B64G 1/411; B64G 1/41342; B64G 1/428; F03H 1/0006; F03H 1/0018
See application file for complete search history.

(56) References Cited

U.S. PATENT DOCUMENTS

| 4,465,253 A | 8/1984 | Lang |
| 6,025,815 A | 2/2000 | Supper |

(Continued)

FOREIGN PATENT DOCUMENTS

| AT | 512487 A1 | 8/2013 |
| JP | 2004096983 A | 3/2004 |
| JP | 2012081528 A | 4/2012 |

OTHER PUBLICATIONS

"Definition of SECANT." Merriam-Webster archived on Apr. 10, 2021 at web.archive.org/web/20210410130732/https://www.merriam-webster.com/dictionary/secant. (Year: 2021).*

(Continued)

*Primary Examiner* — Joshua J Michener
*Assistant Examiner* — Ka Chun Leung
(74) *Attorney, Agent, or Firm* — Nixon & Vanderhye P.C.

(57) ABSTRACT

A spacecraft is disclosed including a frame, an electrical device powered and/or controlled by electrical cables, and a system for orienting the electrical device, which orientation system includes at least two rotary actuators with non-parallel axes (Δa, Δb), a junction part between the two rotary actuators, one or more guide forks, arranged outside the junction part and fastened to the latter, each guide fork including fingers configured to support the electrical cables and to form a guide path for said cables so that the electrical cables never exert, on the rotary actuators, a torque higher than the torque capacity of the actuators, at least one of the (Continued)

forks having a main axis which passes through the center of intersection of the axes of rotation of the actuators.

9 Claims, 2 Drawing Sheets

(56) References Cited

U.S. PATENT DOCUMENTS

| | | |
|---|---|---|
| 10,022,861 B1 | 7/2018 | He |
| 2016/0200456 A1 | 7/2016 | Baudassé |
| 2019/0210744 A1 | 7/2019 | Kawamura |

OTHER PUBLICATIONS

International Search Report with English Translation for PCT/FR2022/051602, dated Nov. 21, 2022, 7 pages.
Written Opinion of the ISA for PCT/FR2022/051602, dated Nov. 21, 2022, 9 pages.
International Preliminary Report on Patentability with English Translation for PCT/FR2022/051602, dated Jul. 12, 2023, 30 pages.

\* cited by examiner

SPACECRAFT COMPRISING AN ELECTRICAL DEVICE AND AN ORIENTATION SYSTEM FOR SAID ELECTRICAL DEVICE

CROSS REFERENCE TO RELATED APPLICATIONS

The present application is a National Phase of International Application Number PCT/FR2022/051602 filed Aug. 23, 2022, which designated the U.S. and claims priority benefits from French Application Number FR 2108922 filed Aug. 26, 2021, the entire contents of each of which are hereby incorporated by reference.

TECHNICAL FIELD

The present invention relates to space systems and in particular to the arrangement of devices supplied with electricity such as ion engines on spacecrafts.

PRIOR ART

In the space field, some electrical devices, such as ion engines, require the use of large-diameter electrical cables which can withstand high current and/or high voltage. It might be necessary to be able to orient some electrical devices, in particular the ion engines for adjusting the direction of their propulsive force.

A constraint in the space field is in particular that the constituent portions of a spacecraft should be able to withstand strong accelerations and vibrations that might appear at the launch or release phases. In addition, in the space field, the relative movements of the constituent portions of a spacecraft generally have to enable a repeatability over a duration of several years, without it being possible to perform maintenance operations. Thus, space systems should have a high level of reliability and robustness.

Document U.S. Pat. No. 6,025,815 entitled "drive unit for adjusting satellite components requiring orientation" is known which teaches about an orientation system by linear actuators arranged in parallel and with connecting rods.

DISCLOSURE OF THE INVENTION

The present invention aims to provide a spacecraft equipped with an electrical device, such as an ion engine, whose orientation is adjusted by means of an improved orientation system.

To do so, the invention provides a spacecraft comprising:
a frame,
an electrical device,
electrical cables for powering and/or controlling said electrical device,
an orientation system for orienting the electrical device about two non-parallel axes of rotation, said rotation system comprising at least two rotary actuators.

The spacecraft according to the invention is characterized in that said orientation system comprises:
a junction part between the two rotary actuators, one of the rotary actuators being connected on the one hand to the electrical device and on the other hand to the junction part, the other rotary actuator being connected on the one hand to the junction part and on the other hand to a frame of the spacecraft, and
one or more guide forks, arranged outside the junction part, each of said guide forks being fastened to the junction part and comprising fingers configured to support the electrical cables and delimit between the fingers, a guide path for said electrical cables; in addition, each guide fork is arranged so that, irrespective of the positions of the rotary actuators, the electrical cables exert, on each of the rotary actuators, a torque that is lower than a torque capacity of the rotary actuator.

Hence, the invention provides a spacecraft provided with an orientation system, the architecture of which combines two (or more) rotary engines, mounted in series via a junction part, and at least one guide fork external to the junction part.

Guidance of the electrical cables of the device to be oriented by the guide fork(s) allows holding the cables of the electrical device in a confined space (the guide path), in order to prevent them from coming into contact with other equipment of the spacecraft arranged nearby. In particular, this confinement (holding in a confined space) of the cables is very useful during the launch and release phases of the spacecraft, during which the cables of the electrical device undergo strong vibrations which might go up to causing breakage of a cable or damaging the surrounding equipment. This arrangement of the cables according to the invention makes the system resistant to strong vibrations and thrust forces.

Because of their stiffness (in particular in the case of large-diameter cables), the cables exert resistive torques on the rotary actuators. While it is useful during the launch and release phases, the confinement of the cables could, on the contrary, be considered negative during operation phases (when the actuators are activated) as it might amplify the torques that the cables exert on the rotary actuators. The use of guide forks according to the invention allows overcoming this drawback on the one hand by supporting the cables, by controlling their position and their curvature, and on the other hand by limiting the stresses and in particular the friction forces to which the cables are subjected or the torques exerted by the cables. In addition, the cables extending outside the junction part, the stresses to which they are subjected are limited; the same consequently applies to the stresses that these cables impose on the actuators.

Thus, the use of one or more guide forks according to the invention allows keeping reduced resistive torques exerted by the cables on the rotary actuators. Thus, the power required for the rotary actuators is optimized. This results in significant mass gain and energy saving. Therefore, a high level of reliability and robustness of the system is obtained, so that many repetitive movements could be executed without maintenance operations.

Another advantage of the invention is that the orientation system allows varying at will the direction of the axes of the electrical device and placing the device in any desired position. Indeed, it allows making the device pivot about two axes of rotation over large angles, for example by +/−25° (with respect to an initial position serving as a reference), and even up to 180° in both directions, the maximum angular amplitude not being limited by the architecture of the orientation system.

The orientation system according to the invention also allows solving any interference between the electrical cables of the electrical device and the equipment located around and/or clearing spaces for the arrangement of other pieces of equipment, by limiting the volume in which said cables can move.

According to a possible feature of the invention, each of the guide fork(s) comprises a fastening branch fastened to the junction part by a first end; moreover, the fingers are in the form of rods, which are secured, via one of their ends, to the second end of said fastening branch.

According to a possible feature of the invention, the electrical cables are free to slip relative to the fingers of each guide fork. In particular, no holding member limiting the movement of the cables according to the longitudinal direction of said fingers is provided. Similarly, the cables are advantageously left free to slip relative to the fingers through the fork, according to the routing direction of said cables. This feature allows minimizing the resistive torques that the cables exert on the rotary actuators.

According to a possible feature of the invention, for one or each of the guide forks, the fingers of said guide fork are rectilinear and parallel to one another. On the other hand, the fingers of the guide forks may be non-parallel from one fork to another. For example, all of the fingers of a first fork extend according to a first direction whereas all of the fingers of a second fork extend according to a second direction.

According to a possible feature of the invention, for one or each of the guide forks, the fingers of said guide fork are coplanar. Preferably, the fastening branch of the guide fork also extends in the same plane as the fingers. For example, all of the fingers of the fork are in a transverse plane that is orthogonal to the axial direction of the junction part where the plane of the fork intersects the junction part, i.e. at the first end of the fastening branch of the guide fork. It should be noted that the axial direction of the junction part may be not rectilinear: it may for example follow a curve that starts from the axis of rotation of one of the actuators while being tangent to this axis, and joins the axis of rotation of the other actuator, tangentially thereto.

According to a possible feature of the invention, for each of the guide forks, the fingers of said guide fork protrude with respect to the cables so as to prevent said cables from coming out of their guide path. In other words, when considering the set formed by the cables received between two consecutive fingers of a fork and when calling "width" the dimension of this set of cables according to the longitudinal direction of the fingers of the fork, the length of the fingers is larger than the width of the set of cables, with enough margin so that, irrespective of the positions of the rotary actuators, all cables remain positioned between the fingers of the fork even if the cables are left free to slip relative to the fingers.

According to a possible feature of the invention, the axes of rotation of the rotary actuators are secant; they intersect at a point so-called the intersection center. This architecture has the advantage of compactness. Alternatively, it is possible to have non-coplanar and non-secant axes of rotation.

According to a possible feature of the invention, at least one or each of the guide forks has a main axis which passes through the center of intersection of the axes of rotation of the rotary actuators. In use, under the effect of the rotation of the actuators activated to adjust the position of the electrical device, the electrical cables of the device which extend between the frame and said device are moved; as the actuators rotate, the amplitude of movement of the cables describes some kind of wave. The arrangement of the fork(s) so that their main axis passes through the center of intersection of the axes of rotation of the actuators allows minimizing the height of this wave. In addition, such an arrangement allows minimizing the movements of the cables transversely to the fingers.

According to a possible feature of the invention, the guide fork(s) is/are configured to receive at least two superposed plies of electrical cables, the cables in each of the plies being arranged side-by-side. Preferably, when the cables are thus organized into two superposed plies, at least one—or preferably each—of the forks comprises three fingers, delimiting two intervals, each interval receiving one of the two plies of cables. It is not excluded to alternatively provide that one (or possibly several ones) of the forks comprise(s) only two fingers, i.e. one single interval receiving the two layers placed on top of one another. However, the embodiment using forks with three fingers is preferred because the separation of the two plies into two distinct intervals eliminates frictions between the plies in favor of frictions between each ply and the fingers that surround it, which frictions of the ply against the fingers are easier to control (and therefore to minimize).

According to a possible feature of the invention, in one embodiment which comprises several guide forks, these are evenly along the axial direction of the cables, so as to have, for each cable, cable sections having substantially the same length between two support points.

This allows better distributing the weight of the cables over the junction part and therefore optimizing design thereof and sizing thereof.

More particularly, if the system comprises only one fork, it is desirable for said fork to be located substantially at the middle of the cables, i.e. on average substantially at equal distance from the two ends of the cables (of course, depending on the positions of the actuators, the middle of the cables could pass from either side of the fork, which is why it is called "average").

Herein again, if the system comprises three forks or more, the forks may be arranged so as to be evenly distributed over the entire length of the cables. Alternatively, it may be preferred for the forks to be evenly distributed along the junction part, independently of the distances existing on the one hand between the electrical device and the junction part and on the other hand between the frame and the junction part. In this variant, for the same given cable, the cable sections located between two forks will have similar lengths, but it is possible to have, on the side of the electrical device or on the side of the frame, a first cable section possibly larger or smaller than the cable sections between two forks.

Conventionally, each rotary actuator comprises a rotor and a stator, and each actuator is provided with a power supply and control harness connected to its stator. According to a possible feature of the invention, the junction part is fastened on the one hand to the stator of the actuator which is connected to the electrical device (the rotor of this actuator being connected to the electrical device) and on the other hand to the rotor the rotary actuator which is connected to the frame of the spacecraft (this actuator being consequently connected to the frame by its stator). Advantageously, this feature allows optimizing the positions of the actuators with respect to their power supply harness. Indeed, the rotation of the actuator which is connected to the frame does not impart any force on the power supply and control harness of said actuator since this harness extends between the frame and the stator of the actuator and that said stator is directly fastened to the frame (the harness therefore extends between two fixed parts). The power supply and control harness of the actuator which is connected to the electrical device extends between the frame of the spacecraft and the stator of said actuator. Choosing to connect the stator of the actuator to the junction part (and the rotor of the actuator to the electrical device) allows limiting the path covered and the forces exerted by the harness on the actuator which is arranged between the electrical device and the junction part.

Of course, it is possible to arrange the rotary actuators differently, i.e. for example to fasten each of the two actuators to the junction part by its stator, or vice versa by its rotor.

In a possible version of the invention, the electrical device to be oriented (with respect to the frame of the spacecraft) is an ion engine.

BRIEF DESCRIPTION OF THE FIGURES

The invention, according to one embodiment, will be well understood and its advantages will appear better upon reading the following detailed description, given for indicative and in no way limiting purposes, with reference to the appended drawings, wherein.

The identical elements illustrated in the aforementioned figures are identified by identical reference numerals.

DETAILED DESCRIPTION

Figure 1:
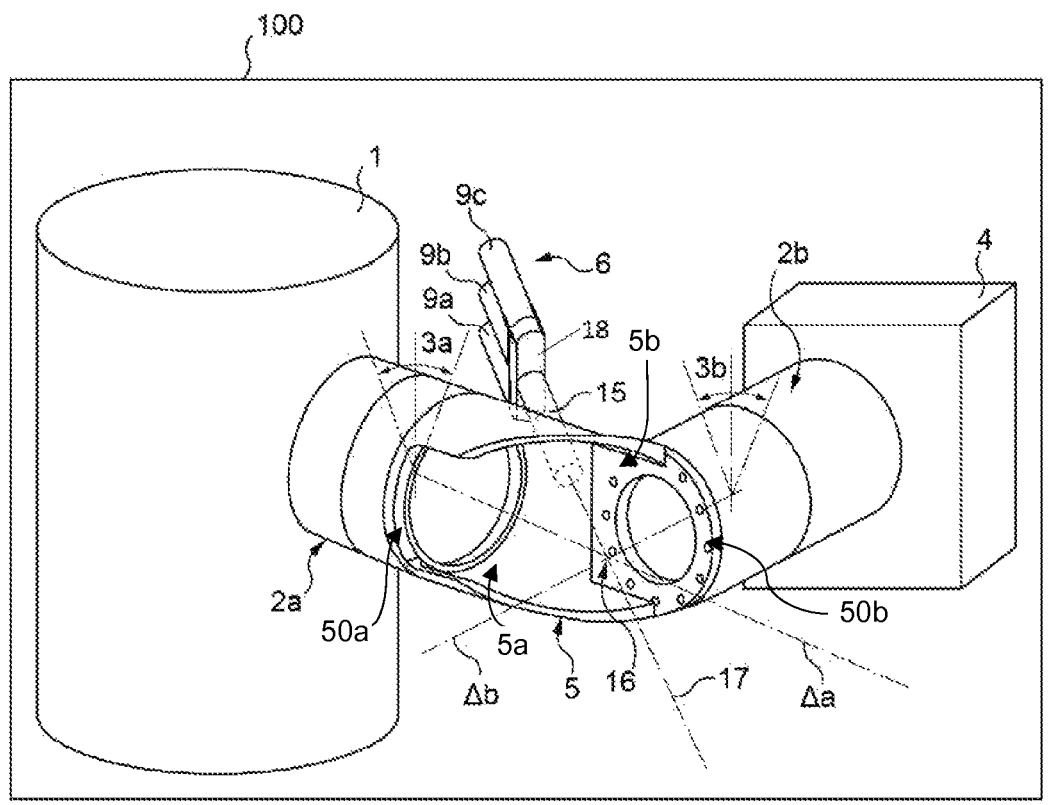
FIG. 1 is a schematic perspective view of a first embodiment of an orientation system according to the invention.

FIG. 1 schematically shows a spacecraft 100 according to the invention, comprising a mobile ion engine 1 and an orientation system allowing orienting said ion engine according to two axes Aa and Ab with respect to a frame 4 of the spacecraft 100. For example, the ion engine may be a gridded ion engine or a Hall-effect thruster.

The orientation system could also be applied to another electrical device installed on the spacecraft, such as a solar panel or an antenna.

The orientation system comprises two rotary actuators 2a and 2b and a junction part 5 which, in the embodiment of FIG. 1, has a beveled sleeve shape. Each rotary actuator comprises a rotor and a stator. The junction part 5 has two interfaces for connection thereof to the rotary actuators 2a, 2b, in this case two openings each equipped with a peripheral rim 50a, 50b, which may be circular as illustrated in FIG. 1. The opening 50a rigidly receives the stator of the rotary actuator 2a, whereas the opening 50b rigidly receives the rotor of the rotary actuator 2b. For example, each rotor or stator of a rotary actuator is fastened on the peripheral rim of the opening with which it is associated.

Moreover, the stator of the rotary actuator 2a is rigidly connected to the ion engine 1, whereas the stator of the rotary actuator 2b is rigidly connected to the frame 4 of the spacecraft. Thus, the ion engine 1 can be oriented, with respect to the frame of the spacecraft, about two axes of rotation $\Delta a$ and $Ab$ according to angular strokes 3a and 3b.

For example, the motors of the rotary actuators may consist of DC motors, AC motors, stepper motors, brushed or brushless motors. The two motors may be of the same type (for example two brushless motors) or of different types (for example one brushed motor and one brushless motor).

For example, the junction part 5 comprises a cylindrical portion whose axis is coincident with the axis of rotation $\Delta a$ of the rotary actuator 2a. The cylindrical portion 5a is truncated in a beveled fashion on one side and normally on its axis on the other side. The end that is truncated normally to the axis has a circular section forming the opening 50a that receives the stator of the rotary actuator 2a.

The junction part 5 comprises a second planar portion 5b, which extends in line with the beveled end of the cylindrical portion 5a. This second planar portion 5b is orthogonal to the axis of rotation $\Delta b$ of the other rotary actuator 2b. This second planar portion 5b may be parallel to the axis of the truncated cylindrical portion 5a, in which case the axes of rotation $\Delta a$ and $Ab$ of the actuators are orthogonal. A circular cutout is formed in the planar portion 5b to form the opening 50b which receives the rotor of the rotary actuator 2b.

In the junction part 5, the circular openings receiving the rotors or the stators are for example arranged with their central axis arranged respectively in two transverse directions with respect to one another. In the illustrated example, the axes of rotation $\Delta a$ and $\Delta b$ of the rotary actuators are perpendicular (i.e. orthogonal and coplanar). Alternatively, they could be only secant with any angle (i.e. coplanar without necessarily being perpendicular). These axes could also be orthogonal without being coplanar (and therefore not secant).

Figure 2:
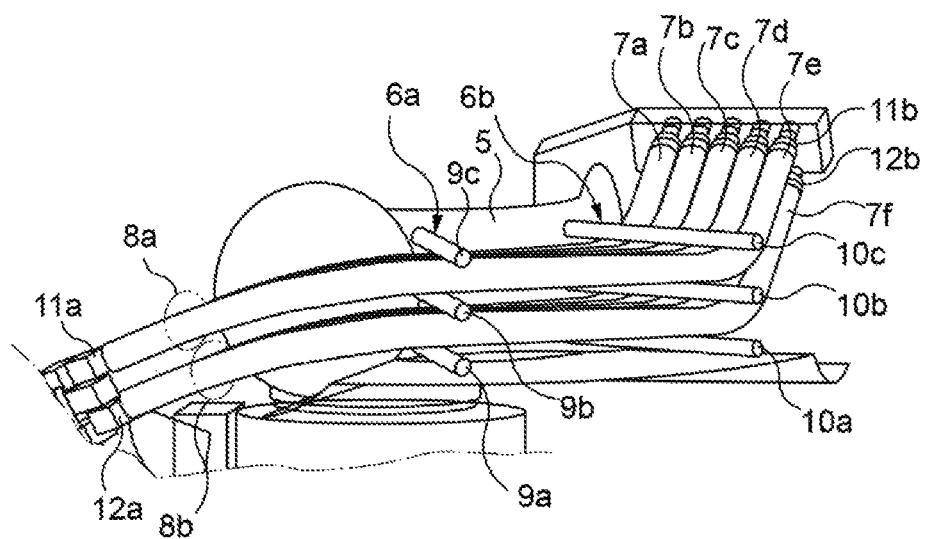
FIG. 2 is a schematic profile view of a second embodiment of an orientation system according to the invention.
Figure 3:
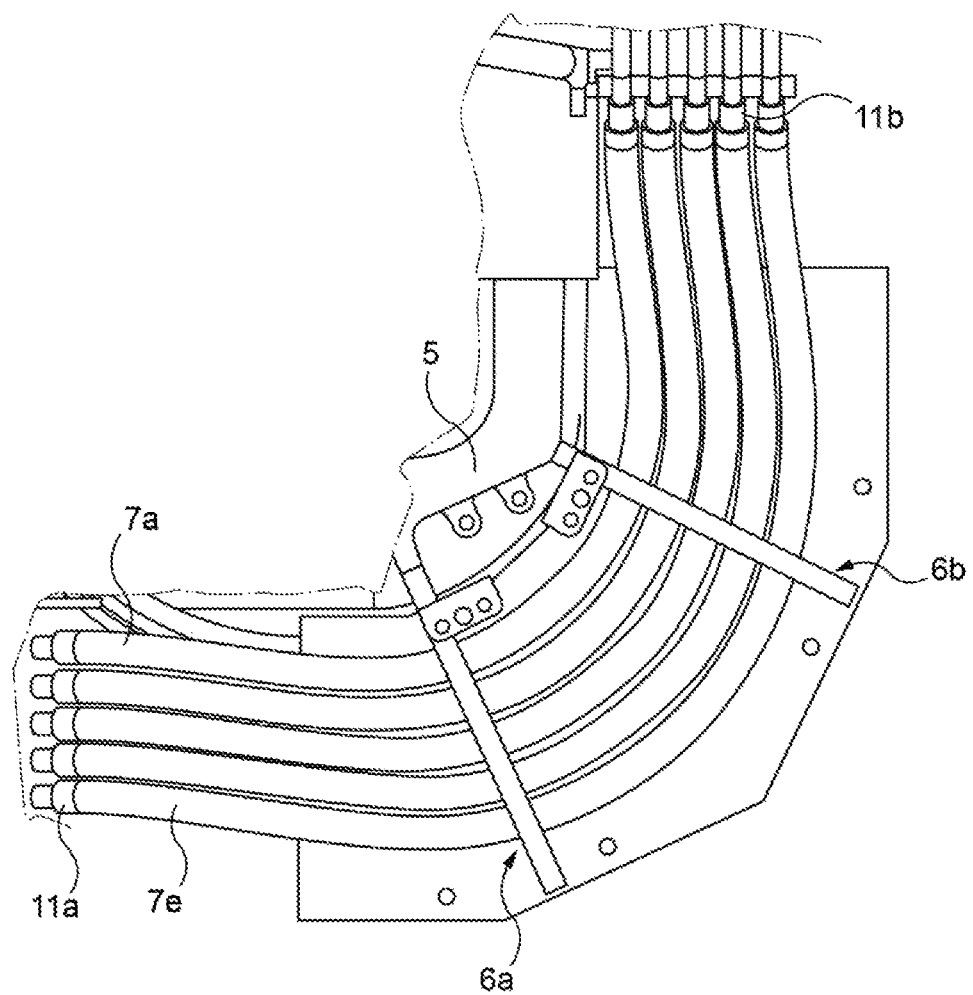
FIG. 3 is a schematic top view of the second embodiment of FIG. 2.

According to the invention, one or more guide forks are also associated with the junction part 5. FIG. 1 illustrates an embodiment including only one fork 6, whereas FIGS. 2 and 3 show an embodiment including two forks 6a, 6b. With the exception of the number of forks used, the principles set forth remain the same for these two embodiments. For clarity, the cables have not been illustrated in FIG. 1, whereas the actuators and the ion engine have not been illustrated in FIGS. 2 and 3.

As shown in FIG. 1, the fork 6 may include three rectilinear, coplanar and parallel fingers 9a, 9b, 9c, carried by a central fastening branch 15.

The fastening branch 15 has a first end which is fastened on the junction part 5. For example, said fastening branch 15 is arranged according to an axis 17 (which corresponds to the main axis of the fork) passing through the center of intersection 16 of the axes of rotation $\Delta a$, Ab of the actuators 2a and 2b. The movements of the cables are then advantageously minimized on either side of this fork.

The three fingers 9a-9c are connected, by one of their ends, to the second end of the fastening branch 15 via a common transverse branch 18.

Alternatively, it is possible to consider a fork with two fingers or a fork with four fingers or more.

The fingers of the fork are intended to receive electrical power supply and control cables of the ion engine 1, generally organized in the form of plies. For example, it is herein chosen to hold one single ply in each interval delimited by two consecutive fingers. The fork with three fingers 9a-9c then allows holding two plies of cables; a fork with two fingers allows holding a ply of cables, a fork with N fingers allowing holding N-1 plies of cables.

For example, the fingers are rectilinear; they could, alternatively, be curved. Whether they are rectilinear or curved, the fingers of the same fork may be parallel to one another, or not.

The fork may have a planar general shape extending transversely to the cables, i.e. the fingers 9a, 9b, 9c and the fastening branch 15 are coplanar (like in the illustrated examples) and the plane of the fork is crossed by the cables. Alternatively, it is possible to have coplanar fingers carried by a fastening branch which is inclined with respect to the plane of the fingers, in particular for ease of construction. What is more, the fingers of the same fork could be non-coplanar.

The fingers may have a circular section. Alternatively, the fingers may have a polygonal section. The fingers may comprise planar portions for supporting the cables. The fingers do not necessarily have a constant section over their entire length.

The cables are held between two consecutive fingers, i.e. two fingers facing one another.

The cables held in the fork remain free to move according to a transverse direction with respect to the fingers, on either side of the fork, and according to a longitudinal direction with respect to the fingers.

As illustrated (cf. FIG. 2 and FIG. 3), the fingers 9a-9c preferably extend projecting with respect to the ply of cables, which, for example, allows holding the cables when they move longitudinally relative to the fingers. The freedoms of movement transversely to the fingers, on either side of the fork, allow adjusting the lengths between the support points of the cables.

It is also possible to consider cables held between the fingers of the fork(s) with restricted degrees of freedom. The torque exerted by the cables on each rotary actuator 2a, 2b remains lower than the torque capacity of the actuator in any circumstance, the torque capacity of an actuator being the maximum reaction torque that the actuator can withstand during operation.

The positioning of the fork(s) is carried out so as to impose one or more curvatures on the cables. Thus, the increase in the number of forks increases the curvatures and the forces and the torques exerted by the cables on the rotary actuators, while remaining within controlled and acceptable limits, i.e. while remaining lower than the torque capacity of each of the rotary actuators.

The number of forks will be advantageously selected so as to optimize the spatial arrangement of the area reserved for the passage of the cables according to the available power of the actuators. The fork(s) enable(s) an arrangement of the cables in a bounded spatial area and thus make(s) the orientation system resistant to vibrations or to thrust forces.

FIG. 2 shows, according to a side view, plies 8a and 8b of electrical cables held by two forks according to the invention. Each fork 6a or 6b comprises three fingers 9a-9c, 10a-10c respectively, and receives two superposed plies 8a and 8b. The cables 7a, 7b, 7c, 7d and 7e in the same ply 8a are arranged side-by-side. The actuators are not illustrated; the junction part 5 between the actuators, on which the guide forks 6a and 6b are fastened, appears very schematically and is visible only in part in FIG. 3; one could notice that it does not necessarily have the same shape as the junction part of the first embodiment of FIG. 1.

Each cable 7a or 7f is fastened at its two ends 11a and 11b or 12a and 12b respectively to the frame 4 and to the electrical device 1 to be powered. As explained before, the cables bearing the references 7a, 7f could for example slip relative to the fingers 9a-9c, 10a-10c of the forks 6a and 6b. The cable could slip relative to a fork in particular when the support point of the cable on the fork is not arranged on the axis of the rotation resulting from the movement of the actuators. The length of the fingers allows holding the cable in the forks.

Thus, control of the positions of the cables and control of their curvatures allows controlling the torques that these cables exert on the rotary actuators because of their stiffness, and in particular allows for a high level of reliability and robustness of the system. Thus, the rotating actuators are loaded in their operating range. Numerous repetitive movements could therefore be executed without maintenance operations.

In addition, irrespective of the positions of the actuator(s), the cables are held inside a determined guide volume, the other constituent elements of the spacecraft could be arranged safely outside this guide volume.

FIG. 3 shows, in top view, the plies of electrical cables held by two forks according to the arrangement of FIG. 2. The fingers of each fork are parallel to one another and protrude with respect to the outer cable 7e, 7f of each ply, so as to prevent the cables from coming out of their guide path, in case of movement of the cables relative to the fingers.

For example, the forks 6a and 6b are evenly distributed so as to have identical lengths of cables between two support points. By "support point" of a cable, it should be understood a fastening point of the cable, for example at one of its ends, or a point of contact of the cable with a fork. Preferably, the average length between two consecutive support points of a cable is substantially the same along said cable. Of course, this length may vary according to the angular positions of the rotary actuators (thereby the average length concept). The length between two consecutive support points also varies from one cable to another, according to their position in the same ply or from one ply to another. For example, the average length between two support points of the inner cable 7a of the ply is smaller than the length of the outer cable 7e of the ply and the variations in position of the outer cable may be more significant.

The arrangement of the forks could be optimized in many different ways, in particular according to the constraints of each mission. Thus, the orientation system according to the invention is particularly adaptable to different spatial missions, for the orientation of one or more ion engines or other electrical devices to be powered.

The invention claimed is:

1. A spacecraft, comprising:
a frame,
an electrical device,
electrical cables for powering and/or controlling said electrical device,
at least two rotary actuators for orienting the electrical device about two non-parallel axes of rotation ($\Delta a$, $\Delta b$),
the spacecraft further comprising:
a junction part between the at least two rotary actuators, one of the at least two rotary actuators is configured to be connected on the one hand to the electrical device and on the other hand to the junction part, the other of the at least two rotary actuators is configured to be connected on the one hand to the junction part and on the other hand to the frame, and
one or more guide forks, arranged outside the junction part, each of said guide forks being fastened to the junction part and comprising fingers configured to support the electrical cables and delimit between the fingers a guide path for said electrical cables,
and in that each guide fork is arranged so that, irrespective of the positions of the rotary actuators, the electrical cables exert, on each of the rotary actuators, a torque that is lower than a torque capacity of the rotary actuator,
and in that the two non-parallel axes of rotation ($\Delta a$, $\Delta b$) of the rotary actuators intersect at an intersection center and at least one of the guide forks has a main axis that passes through said intersection center.

2. The spacecraft according to claim 1, wherein each of the guide fork comprises a fastening branch fastened to the junction part by a first end, the fingers being in the form of rods secured, via one of their ends, to a second end of the fastening branch.

3. The spacecraft according to claim 1, wherein the electrical cables are free to slide relative to the fingers of each guide fork.

4. The spacecraft according to claim 1, wherein, for each guide fork, the fingers of said guide fork are rectilinear and parallel to each other.

5. The spacecraft according to claim 1, wherein, for each guide fork, the fingers of said guide fork protrude with respect to the cables so as to prevent said cables from coming out of their guide path.

6. The spacecraft according to claim 1, wherein at least one of the guide forks comprises three fingers delimiting two intervals for receiving at least two superposed plies of electrical cables, the cables in each of the plies being arranged side-by-side.

7. The spacecraft according to claim 1, wherein the guide forks are evenly distributed along an axial direction of the cables so as to have, for each cable, cable sections having substantially the same length between two support points.

8. The spacecraft according to claim 1, wherein each of the at least two rotary actuators comprises a rotor and a stator and the junction part is fastened on the one hand to the stator of the at least two rotary actuators which is connected to the electrical device and on the other hand to the rotor of the other of the at least two rotary actuators which is connected to the frame of the spacecraft.

9. The spacecraft according to claim 1, wherein the electrical device is an ion engine.

* * * * *